Sept. 3, 1957 C. G. MUNTERS 2,804,657
HEAT INSULATED WALLS OF COLD-STORAGE ROOMS
Filed Sept. 30, 1952.
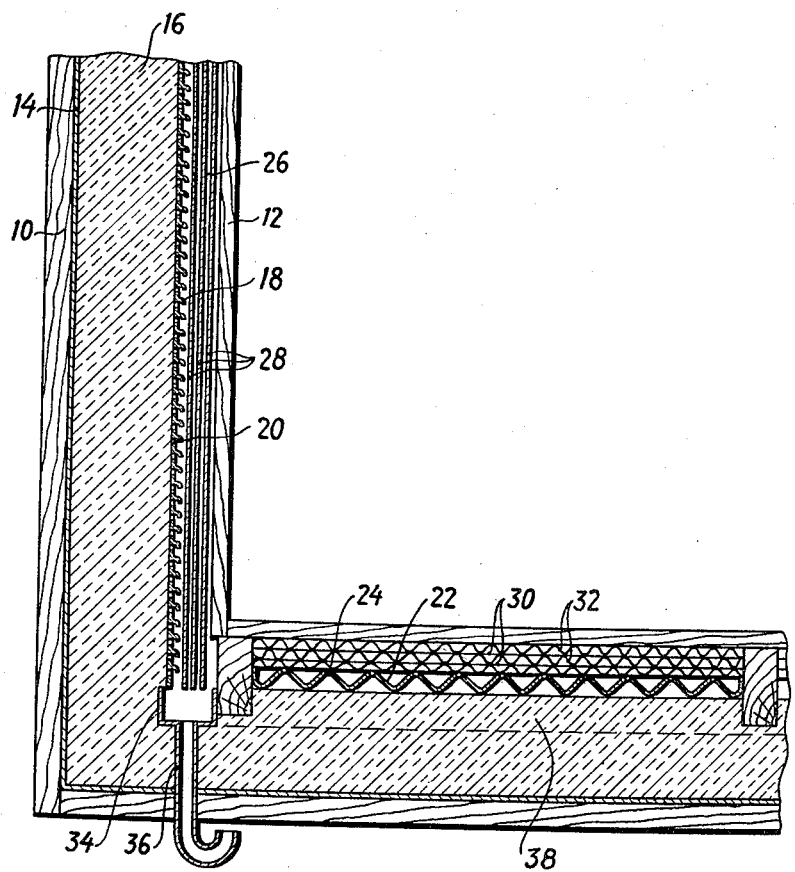

United States Patent Office 2,804,657
Patented Sept. 3, 1957

2,804,657

HEAT INSULATED WALLS OF COLD-STORAGE ROOMS

Carl Georg Munters, Stocksund, Sweden

Application September 30, 1952, Serial No. 312,365

Claims priority, application Sweden October 2, 1951

2 Claims. (Cl. 20—4)

My invention relates to the heat insulated walls of cold-storage rooms, and particularly to the heat insulated walls of cold-storage freight vehicles, such as cold-storage railroad cars.

When the temperature and consequently the absolute percentage of moisture of the ambient atmosphere is higher than that prevailing in the interior of the cold-storage room, an inwardly directed diffusion of moisture will unavoidably occur through the insulation of the walls of the room. This applies also to walls having an outer casing and an inner lining enclosing the insulation of which the outer casing has an adjacent diffusion barrier such as a double layer of asphalt. During its passage through the insulation the moisture meets successively colder zones until finally the dew-point is reached which involves that the water vapor pressure of the air meets the curve of saturated vapor. This results in the precipitation of the moisture in the form of water or ice which is absorbed by the insulation and impairs its insulating capacity. The decrease of the insulating capacity may become so great as to increase the coefficient of heat transfer through the wall to double or more of the original value.

One object of my invention is to provide means to keep dry the insulation of a wall of the type described and to counteract an accumulation of water in the insulation.

A further object of my invention is to provide means causing the precipitation of moisture penetrating into the wall at a place permitting the accumulation or collection of water or ice and their removal without wetting the insulation proper.

To this end, I give the insulation an extent from the outer casing, toward the inner lining for such a distance only as to locate the same outside the zone wherein water vapor penetrating inside from the ambient atmosphere through the diffusion barrier normally has a pressure corresponding to the pressure of saturation. Between the insulation and the inner lining I provide a space for receiving and collecting moisture precipitating therein, said space permitting the flow of the condensate to drain while preventing the condensate from wetting the insulation.

I prefer to bound said space adjacent the insulation by a layer adapted to permit an inward diffusion of vapor from the insulation but to counteract condensate precipitated in said space from wetting the insulation. In order to ensure that the zone in which the pressure of saturation of the water vapor is reached is located inside the space, I prefer to dispose in the space a secondary insulation adapted to permit drainage of condensate to the drain, said secondary insulation suitably consisting of a few layers of foils or sheets inserted into the space.

The temperature in the room and the wall is frequently lower than 0° C., which involves that the precipitated moisture freezes to ice. It will then be necessary to defrost the space at certain time intervals, the melting water then flowing out of the space and escaping from the wall through the drain. As stated, this water is prevented, owing to the nature of the layer, from wetting the main portion of the insulation. To suit this purpose the foils inserted into the space are of such a nature that they do not absorb the moisture precipitating thereon.

Further objects and advantages of the invention will be apparent from the following description considered in connection with the accompanying drawing, which forms part of this specification, and which is a section through a part of a vertical wall and a part of a floor of a cold-storage railroad car.

Referring to the drawing, 10 designates the outer casing, and 12 the inner lining, respectively of the walls and the floor and the roof of the cold-storage car. The casing may be made from wood or fibrous boards or sheet-metal. In stationary cold-storage rooms the outer casing may constitute the carrying concrete structure, while the inner lining is made from plaster, boards or the like. In order to limit the inward diffusion of warm and moist external air as far as possible, the outer casing 10 is provided on its interior face with a diffusion barrier 14, for instance in the form of two asphalt coatings. The wall is filled for the major portion of its depth with an insulating material 16, preferably in the form of multi-layer slabs, glass wool or porous boards, such as cork. At a distance from the inner lining 12 and inside the insulating layer 16 is provided a layer, which in the vertical wall portions may be constituted by a sheet 18 of sheet-metal, water-proof cardboard or the like, preferably provided with perforations or otherwise shaped so as to permit water vapor to diffuse therethrough at a low resistance. The perforations may be provided by small upset flaps 20, which at the same time form a dripping protection. The layer 18 may be used to brace the insulating material, when the latter is deficient in stiffness of its own. On the other hand, if the insulating material is self-sustaining, the layer 18 may be carried thereby. In the embodiment shown, the layer 22 arranged in the floor is of a corrugated shape with openings 24 at the upper ridges. A space 26 disposed between the layers 18, 22 and the lining 12 may contain an insulating material, such as plane foils 28 in the vertical wall portions and alternately plane and corrugated foils 30, 32 in the floor, which may be combined with each other in known manner into a slab. The foils may be made from waterproof paper, plastic or the like. Underneath the layer 18 and the space 26 is a longitudinally extending draining channel 34 for condensate which escapes through one or more draining passages 36, that may constitute a water seal or may be fitted with a valve preventing air from the ambient atmosphere from penetrating into the wall. The foils 30, 32 and the corrugated sheet metal layer 22 may slope somewhat in the direction of the corrugation folds toward a similar draining channel 38 to facilitate the drainage.

The moisture penetrating inwardly from the ambient atmosphere may pass unimpededly or practically unimpededly through the layers 18, 22 because of the perforations provided therein. The curve of saturation is reached in the space 26, so that moisture is precipitated. If the temperature in the space 26 is below 0° C., ice will deposit on the exterior face of the lining 12 and on the foils 28, 30, 32. The precipitated moisture will thus not be located within the insulating layer 16, the insulating capacity of which thus remains unimpaired. From time to time the temperature is raised above the freezing point, so that the ice is caused to melt and flows down into the channels 34. On account of the special formation of the layers 18, the melting water is at the same time counteracted or prevented from wetting the insulating layer 16.

While one more or less specific embodiment of the invention has been shown, it is to be understood that this is for purpose of illustration only, and the invention is not to be limited thereby, but its scope is to be determined by the appended claims.

What I claim is:

1. A heat insulated wall for cold storage rooms comprising a spaced outer casing and an inner lining, means providing a diffusion barrier adjacent to said casing on the inner side thereof, heat insulating material located between said casing and said lining and extending from said diffusion barrier toward said lining but spaced therefrom to the extent that the dew point of the water vapor normally diffused through the insulation from the ambient atmosphere is located in said space between said insulating material and said lining, means located in the space between said insulating material and said lining providing a surface for the collection and discharge of moisture diffused through said insulating material, and a drain communicating with said space for removing condensate collected on and discharged from said means, said means located in the space between said insulating material and said lining comprising one or more sheets arranged in said space and disposed to collect condensed moisture and effect gravity drainage thereof to said drain out of contact with the insulating material.

2. A wall as defined in claim 1 in which said means located in said space comprises a plurality of corrugated sheets inclined to the horizontal in the direction of the corrugations to provide the aforesaid drainage of the condensed moisture therefrom by gravity.

References Cited in the file of this patent

UNITED STATES PATENTS

| | | |
|---|---|---|
| 1,931,066 | Eckert | Oct. 17, 1933 |
| 2,044,600 | Williams | June 16, 1936 |
| 2,140,689 | Collins | Dec. 20, 1938 |
| 2,192,933 | Saborsky | Mar. 12, 1940 |
| 2,264,961 | Ward | Dec. 2, 1941 |
| 2,287,400 | Wells | June 23, 1942 |
| 2,338,452 | Munters et al. | Jan. 4, 1944 |
| 2,427,937 | Willson | Sept. 23, 1947 |
| 2,548,576 | Willson | Apr. 10, 1951 |